Figure 3:
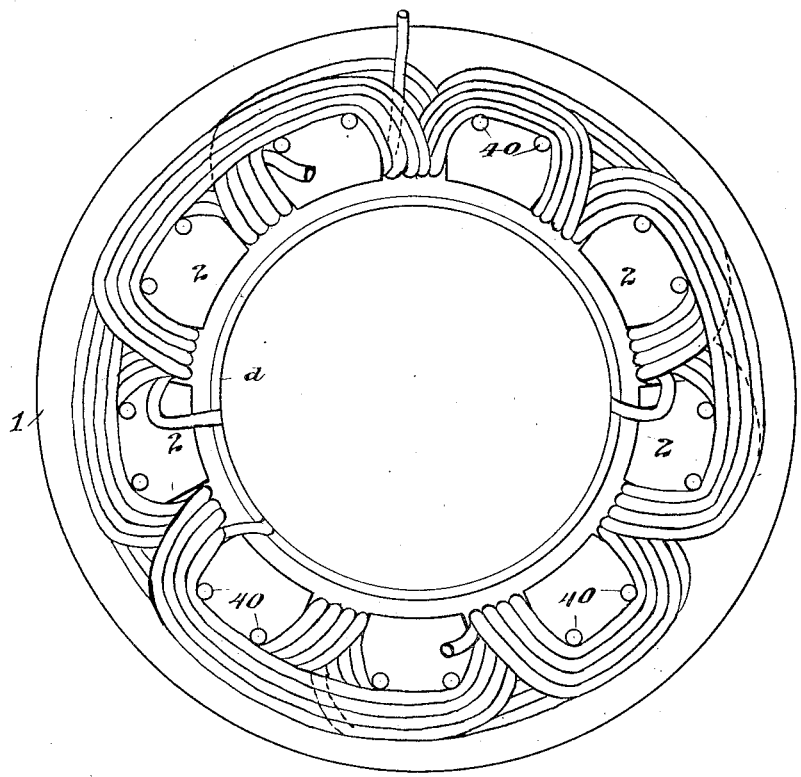

No. 819,971. PATENTED MAY 8, 1906.
J. F. BECK.
ELECTRIC MOTOR AND GENERATOR.
APPLICATION FILED MAR. 2, 1903.
7 SHEETS—SHEET 1.
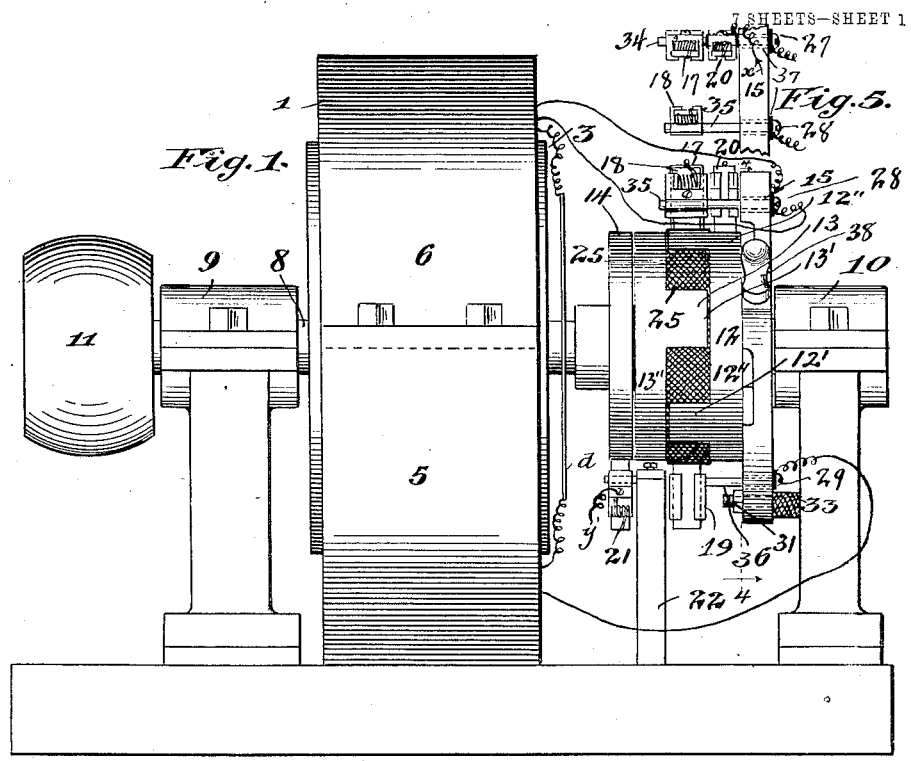
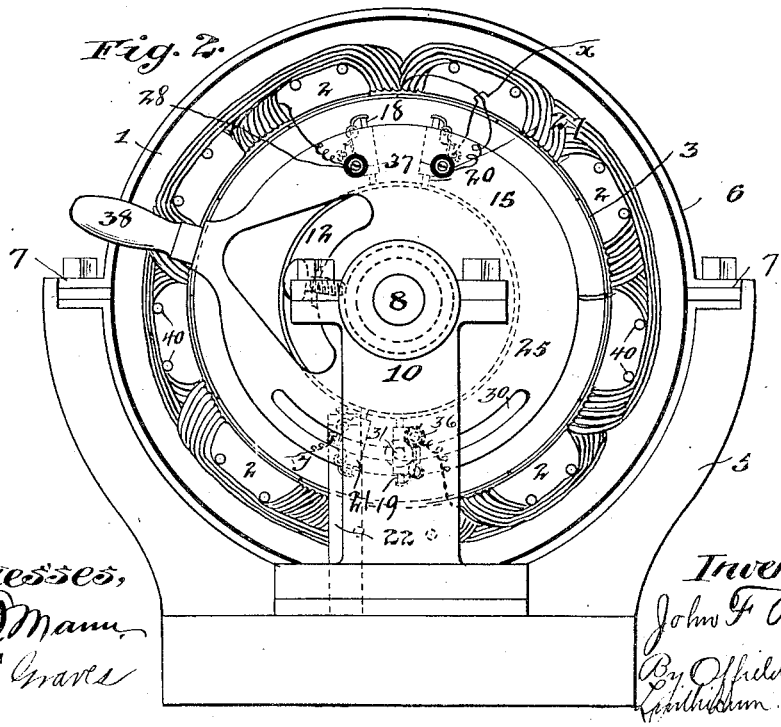
Witnesses,
Inventor,
John F. Beck, No. 819,971. PATENTED MAY 8, 1906.
J. F. BECK.
ELECTRIC MOTOR AND GENERATOR.
APPLICATION FILED MAR. 2, 1903.

7 SHEETS—SHEET 2.

Witnesses,
Inventor,
John F. Beck,
By Offield Towle & Linthicum,
Attys.

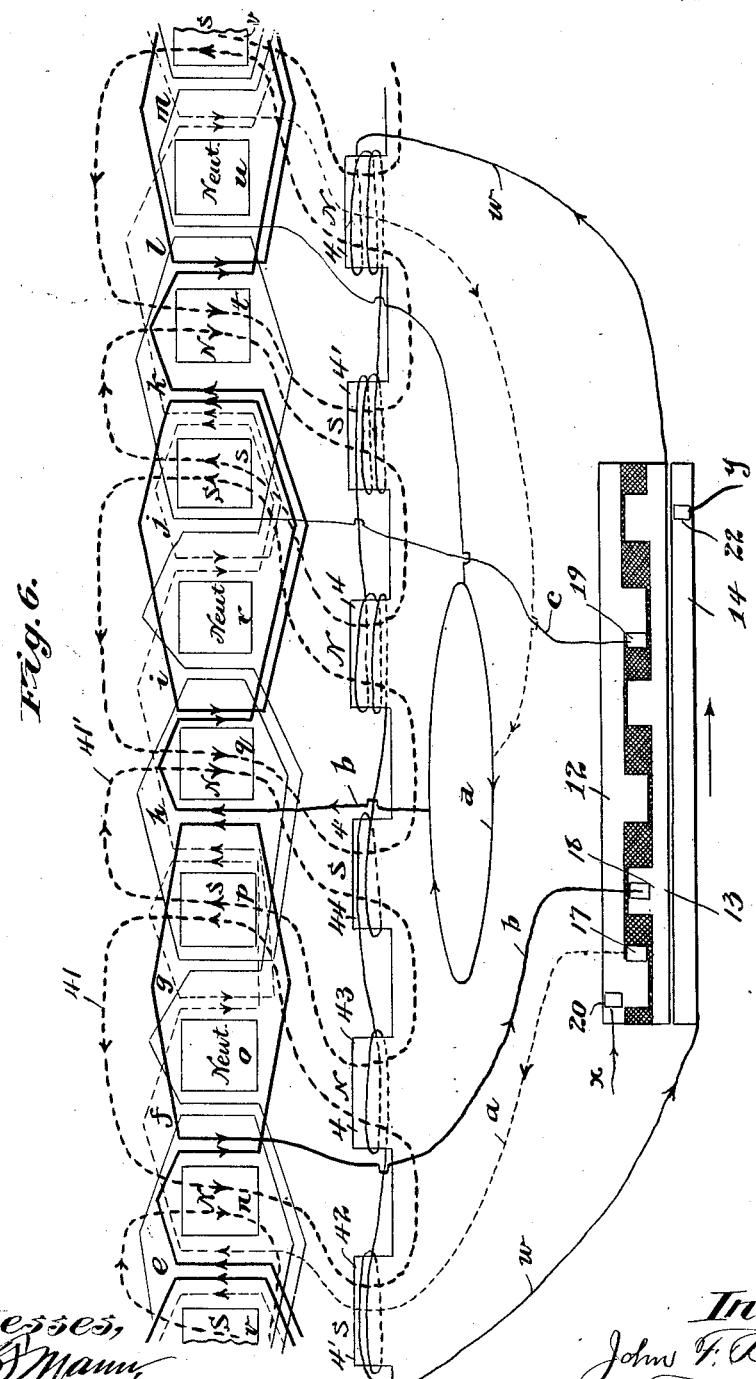

No. 819,971. PATENTED MAY 8, 1906.
J. F. BECK.
ELECTRIC MOTOR AND GENERATOR.
APPLICATION FILED MAR. 2, 1903.
7 SHEETS—SHEET 4.
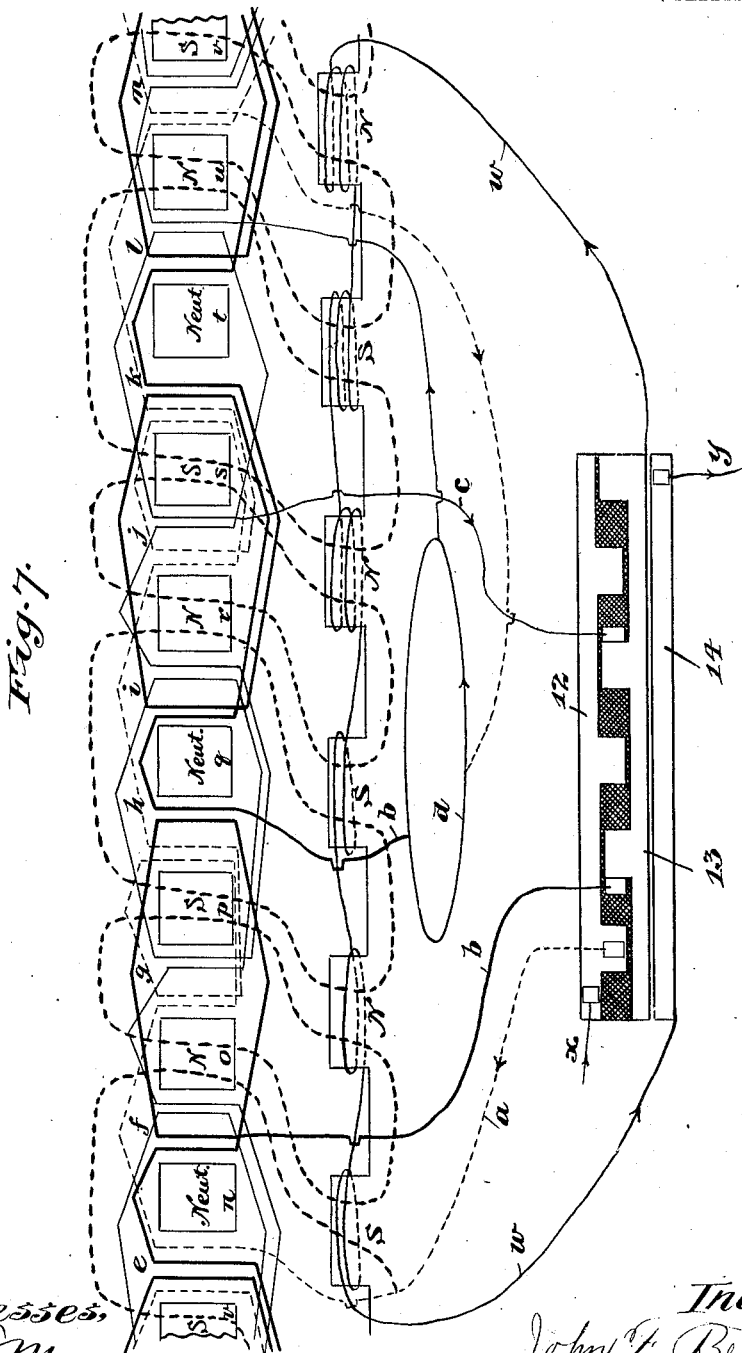

No. 819,971. PATENTED MAY 8, 1906.
J. F. BECK.
ELECTRIC MOTOR AND GENERATOR.
APPLICATION FILED MAR. 2, 1903.
7 SHEETS—SHEET 5.
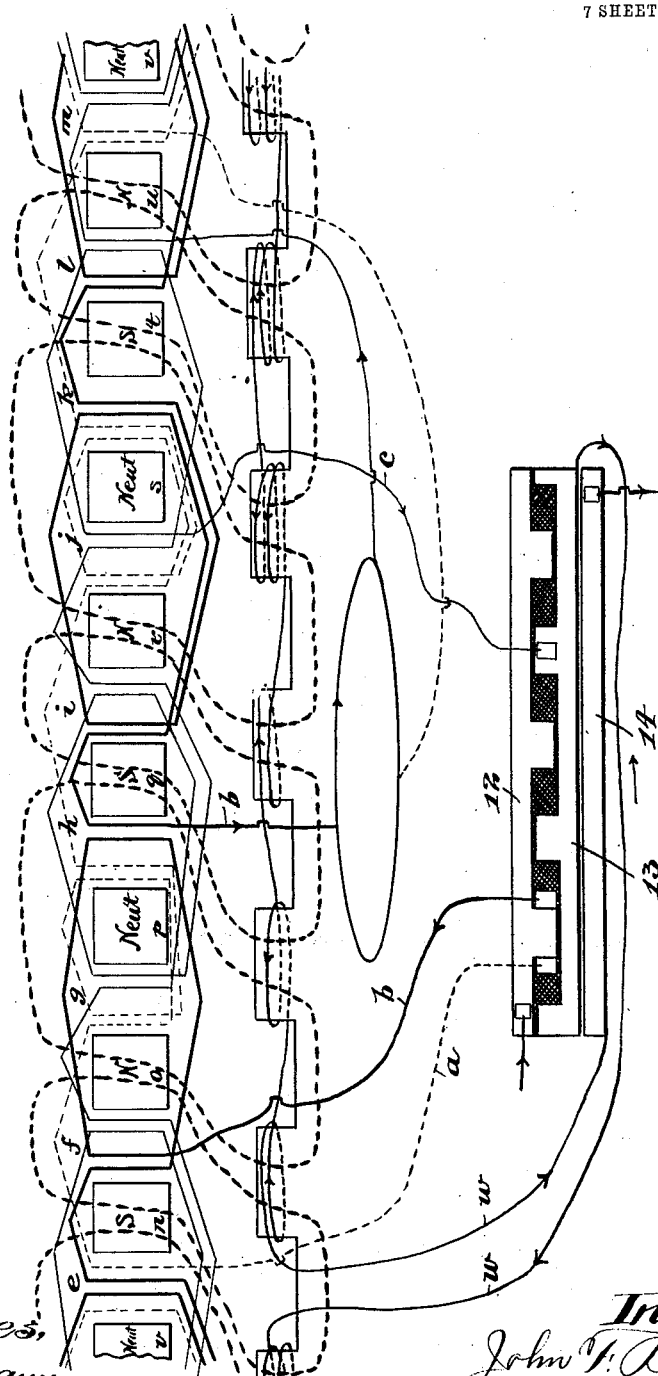

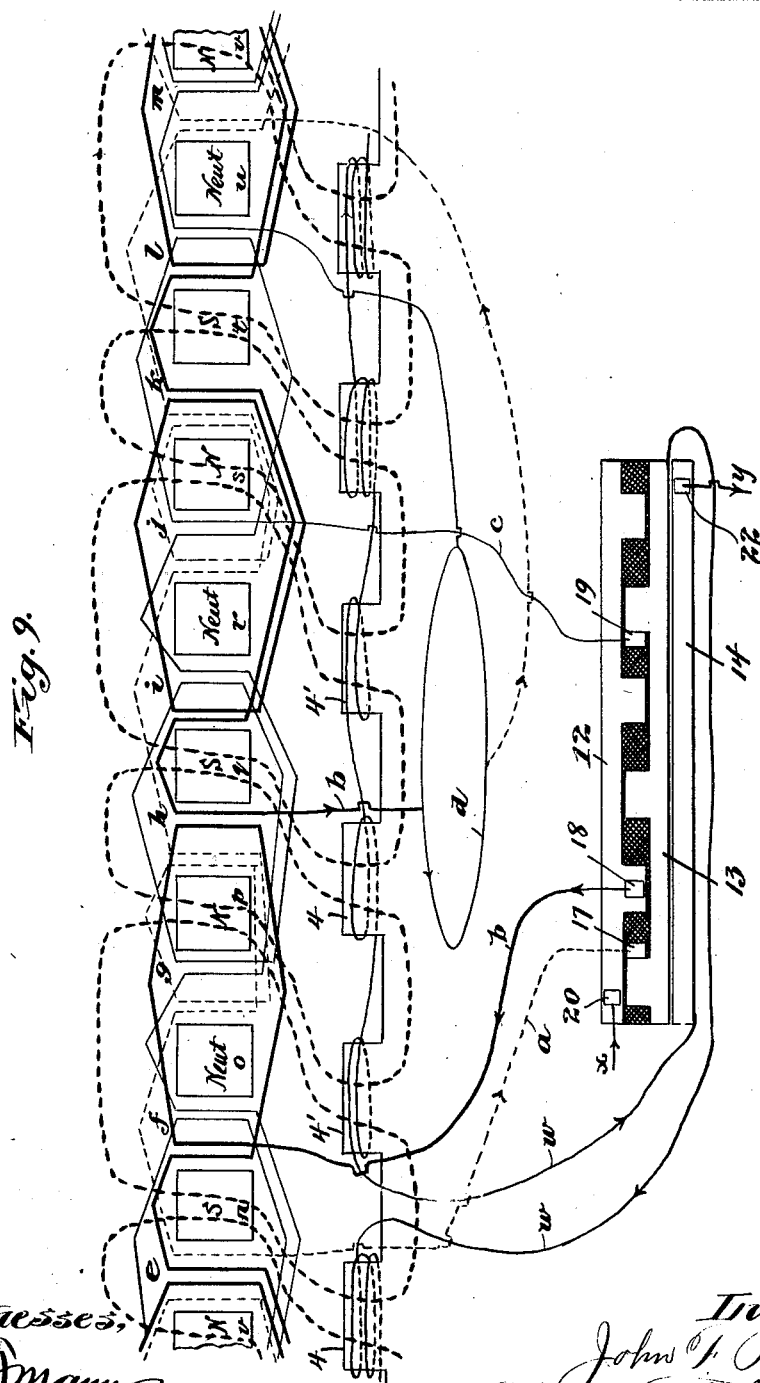

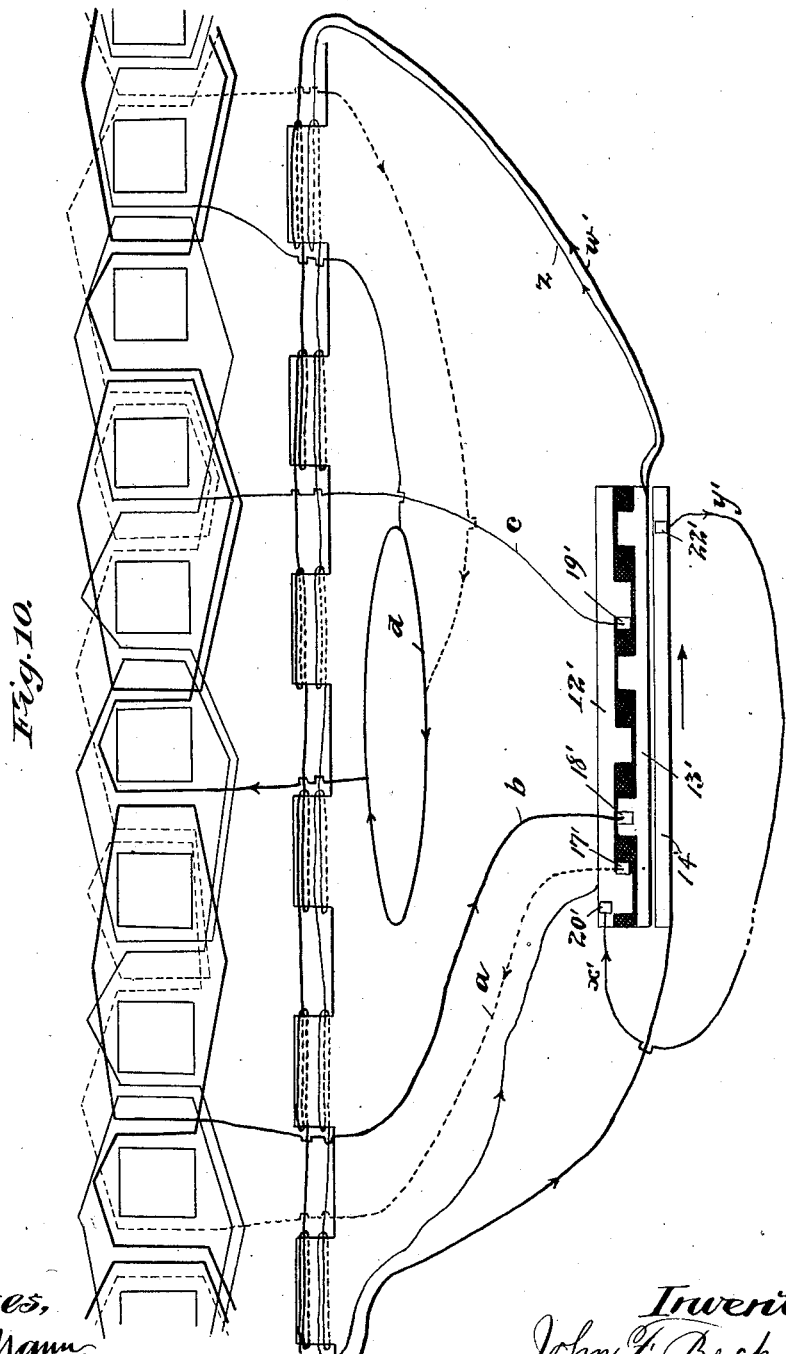

UNITED STATES PATENT OFFICE.

JOHN F. BECK, OF CHICAGO, ILLINOIS, ASSIGNOR OF ONE-HALF TO EDWARD F. HAMM, OF CHICAGO, ILLINOIS.

ELECTRIC MOTOR AND GENERATOR.

No. 819,971.  Specification of Letters Patent.  Patented May 8, 1906.

Application filed March 2, 1903. Serial No. 145,831.

*To all whom it may concern:*

Be it known that I, JOHN F. BECK, a resident of Chicago, in the county of Cook and State of Illinois, have invented certain new and useful Improvements in Electric Motors and Generators, of which the following is a specification.

This invention relates to improvements in electric motors and generators, and refers more specifically to an improved machine adapted to use or produce a direct current, commutating devices being provided, whereby a rotating field is induced when used as a motor and whereby the currents are rectified when employed as a generator.

Among the salient objects of the invention are to provide an armature in which a rotating magnetic field is induced composed of a plurality of magnetic circuits or fields, which fields are successively broadened and narrowed circumferentially to produce the advancing rotating movement; to provide a construction of the character referred to wherein the poles of the rotor and stator are unequal in number, so as to avoid any dead-center points and insure the starting of the motor from any point of rotation; to provide an improved construction and arrangement of the winding of the armature which insures a maximum impelling force or torque with a given expenditure of current, as well as producing the rotating field hereinbefore mentioned; to provide an improved arrangement of the windings by which a maximum portion of the armature is active or acting at all times, thereby insuring high efficiency; to provide in a machine of this character a construction in which the disposition or arrangement of the windings is such that a maximum portion thereof lies substantially at right angles to and intersects the magnetic fields of greatest intensity during operation; to provide a construction and arrangement wherein the commutations occur coincidently with the natural reversals of induced currents, thereby avoiding sparking and reducing the liability of destroying the insulation and securing a maximum efficiency; to provide a construction in which the entire current is caused to circulate through both armature and field member serially, and in general to provide a simple, improved, and efficient machine of the character referred to.

To the above ends the invention consists in the matters hereinafter described, and more particularly pointed out in the appended claims; and the invention will be readily understood by reference to the accompanying drawings, forming a part thereof, and in which—

Figure 4:
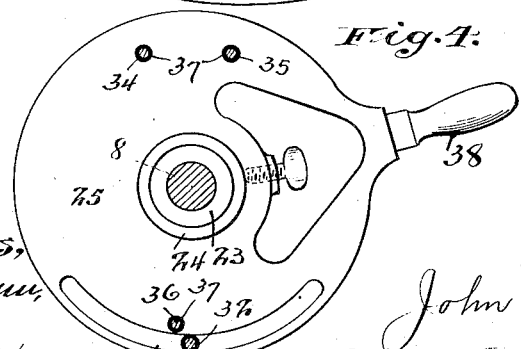

Figure 1 is a side elevation of a motor constituting a preferred embodiment of the invention. Fig. 2 is an end elevation of the same looking at the commutator end of the motor. Fig. 3 is an end view of the stator-ring, showing more particularly the arrangement of the windings thereof. Fig. 4 is a sectional view taken approximately on line 4 4 of Fig. 1 and looking in the direction of the arrows and showing more particularly the construction of the rocker upon which the commutator-brushes are mounted. Fig. 5 is a fragmentary top plan view of the commutator mechanism, showing the relative arrangement of the commutator and upper slip-ring brushes. Fig. 6 is a diagrammatic view of the windings of both rotor and stator and their circuit connections with the commutator and slip-ring brushes, said view also illustrating the relative position of parts in one angular position of the motor. Figs. 7, 8, and 9 are views similar to Fig. 6, except that in each the motor is shown advanced a step farther than in the preceding, the four angular positions shown in the four diagrams illustrating four-sixths of a complete revolution. Fig. 10 is a diagrammatic view generally similar to Figs. 6 to 9, but showing a modified form of winding in which the rotor is compound wound, this winding and arrangement being suitable when the machine is to be used as a dynamo.

In the preferred embodiment of my invention illustrated, the stator, which constitutes in the present instance the armature of the motor, (indicated as a whole 1,) constitutes, as most usually, the outer member of the machine and is in the form of a complete ring provided with radially inward projecting pole-pieces 2, which approach the periphery of the rotor or field element, (designated as a whole 3.) The field member is of the pole or Pacinotti type, having a plurality of radially-disposed pole projections 4 and 4', which are encircled by a series-winding, alternate poles being oppositely wound to induce opposite polarity. The polarity of the poles of the field member remains fixed.

The windings of the stator or armature are of that general type in which the effective portions of the conductors extend through the notches or gaps between the pole-pieces in a direction substantially parallel to the axis of the armature, while the connecting portions of these conductors are arranged in different circumferential planes for the different windings and radially outside of the notches or recesses between the pole-pieces, as shown most clearly in Fig. 3.

Referring more particularly to Figs. 1 to 5, inclusive, the stator-ring is shown as suitably mounted with its axis horizontal in a yoke 5, which constitutes the main standard of the motor, a strap or casing 6 being arranged to encircle the stator-ring and being provided at diametrically opposite points with ears 7, which are secured to the upper ends of the yoke 5, as shown clearly in Fig. 2. The stator-ring, it will be understood, is insulated from the strap 6 in the usual manner. The rotor 3 is supported concentrically within the stator upon the usual main shaft 8, which is journaled at its respective ends in standards 9 and 10 in the usual manner, one end of said main shaft being provided with the usual pulley 11, while the opposite end carries the commutator mechanism. The commutator mechanism is mounted at a point between the standard 10 and the proximate end of the armature, and comprises two commutator-rings 12 and 13, respectively, a slip-ring 14, and a rocker 15, which carries the commutator-brushes proper, the latter being respectively designated 17, 18, and 19. The two commutator-rings 12 and 13 are each provided with integrally laterally projecting segments 12' and 13', respectively, of like circumferential width and arranged to interfit between each other, as best shown in Fig. 1, the interfitting segments constituting the commutator-bars proper, while the continuous portion of the ring 12'' constitutes a slip-ring which is engaged by the brush 20. Each commutator-ring has three commutator-bar segments, and between each continuous pair of commutator-bars is interposed an insulating-block 25 of a circumferential width equal to the width of one of the commutator-bars. It follows, therefore, that there are six commutator-segments and six insulating-blocks around the circumference of the commutator. The slip-ring 14 is insulated from the adjacent commutator-ring 13, and a brush 21 is arranged to coöperate with this slip-ring, this brush being conveniently mounted upon a standard 22, which rises from the base of the machine, as indicated clearly in Fig. 1. The three commutator-brushes proper—namely, those designated 17, 18, and 19—are disposed in definite angular relation to each other, the brushes 17 and 18 being arranged at an angular distance apart from center to center equal to the angular distance apart between the centers of pole-pieces of the armature, while the third brush 19 is arranged at a point diametrically opposite a point midway between the two brushes 17 and 18. The face or acting widths of the several commutator-brushes are substantially equal to one-third the width of the commutator-bars, these relations being necessary to secure proper commutation, as will hereinafter appear. In order that the commutator-brushes may be adjusted to vary the lead, they are all three mounted on the rocker 15, hereinbefore referred to, which rocker is conveniently constructed and arranged as follows:

Referring more particularly to Fig. 4, wherein the rocker is shown in detail, it comprises a plate-like member provided with a central shaft-aperture 23, adapted to the main shaft of the armature and within which is fitted an insulating wearing-bushing 24. The body of the rocker (designated as a whole 25) has the form of a disk provided with binding-posts, as 27, 28, and 29, to which conductors may be attached. 30 designates an arc-shaped slot arranged concentric to the main shaft and serving to accommodate a set-bolt 31, which extends through the rocker and into the journal-standard of the motor. Desirably the set-bolt is provided with a bushing 32, which is provided with a flange 33, interposed between the journal-standard and the proximate side of the rocker and forming a support against which the rocker is clamped by means of the set-bolt. The two arms of the rocker are each provided with brush-supporting studs, (designated 34, 35, and 36, respectively,) which are seated, as usual, in insulating-bushings 37. Conveniently and in the construction shown the ends of said brush-supporting studs extend through the rocker and form the binding-posts, hereinbefore referred to. At a convenient point the rocker is provided with a radially-extended handle 38, whereby it may be manipulated in adjusting it to position after the set-bolt has been released.

The method of winding the stator is peculiar and will now be described, reference being had more particularly to Figs. 3 and 6. The coils of the stator comprise three distinct fractional windings, each of which extends entirely around the stator. The several windings are respectively designated $a$, $b$, and $c$, and, as shown clearly in Fig. 6, one end of each winding is connected with a corresponding commutator-brush, while at their opposite ends they are connected with a common ring $d$ at the electrical center of the stator. For convenience of description the notches or gaps between the poles of the stator will be designated $e$ to $m$, inclusive, while the pole-pieces will be correspondingly designated $n$ to $v$, inclusive. Describing the windings and commencing with conductor $a$, for example, it extends from the commutator-brush through the gap $e$ and is then wound in a right-hand direction around the two poles $n$ and $o$ until the gaps $e$ and $g$ are one-fourth full. The winding is then reversed and extended around the single pole $p$ until the gap $h$ is one-fourth full, at which time, it will be noted, the gap $g$ will have been half-filled. The winding is next reversed and wound right-handedly around the two poles $q$ and $r$ until the gap $j$ is one-fourth full, then wound reversely around the single pole an equal number of turns, and so on around the entire stator-ring, the end of the winding coming out finally at the gap $m$ and extending thence to the common connecting-ring $d$. Similarly the conductor $b$ extends from the commutator-brush through the gap $f$, thence to the left around pole-pieces $o$ and $p$ until the gap $f$ is one-fourth filled, whereupon the conductor is wound reversely around the single pole $n$ to the left an equal number of turns, then reversed and extended around the two poles $v$ and $u$ to the left, and so on around the entire stator-ring, the end of the conductor coming out at the gap $h$ and extending thence to the common connecting-ring $d$. Similarly the conductor $c$ extends from the commutator-brush to and through the gap $j$, thence to the right around the two poles $s$ and $t$ until a number of windings equal to one-fourth the capacity of each gap has been placed, which, it will be noted, completely fills these two gaps, thence is wound reversely around the pole-piece $r$ to the left an equal number of turns, and so on to the left around the entire stator-ring, finally emerging at the gap $l$ and extending thence to and connected with the ring $d$. It will be noted that the final winding will exactly fill out all of remaining unfilled gaps of the stator—that is to say, the arrangement of the three windings is such that four sets of coils, each occupying one-fourth of the gap, are grouped together, and the winding is as a whole symmetrical. The winding of the rotor consists of a single conductor $w$, which is permanently connected with commutator-ring 13 and extends thence to the first pole of the series and is wound around the latter in one direction until the adjacent gaps are half full. The winding is then extended reversely around the next adjacent pole-piece an equal number of turns, and so on around the entire rotor with alternating right and left hand turns, so that north and south poles alternate. The terminal end of the conductor is extended to and permanently connected with the slip-ring 14. In order that the coils of the several windings of the stator may be held reliably within their respective gaps, each group of windings as it emerges from the gap is deflected radially outward and extended around two or more pins 40, which are set in the side faces of the stator-ring to extend substantially parallel with the axis of the armature and radially outside of the notches or gaps of the stator-ring. This arrangement is a common one, considered in a general sense, and is shown clearly in Fig. 3, it being understood that the opposite side of the stator is constructed and arranged substantially like that seen in Fig. 3. The circuits through the motor as they exist in the various positions of rotation constituting a cycle of commutations, as shown in diagrammatic Figs. 6 to 9, inclusive, may now be described and readily understood.

Referring to Fig. 6, and assuming that the rotor is rotating to the right, or in the direction of the arrow applied thereto, and that the conductors $x$ and $y$, connected with the commutator-brushes 20 and 22, respectively, designate the positive and negative conductors leading from and to a suitable source of current-supply, the circuits are as follows: Current entering through conductor $x$ and brush 20 passes from the commutator-ring 12 to the commutator-brush 17, which has at this moment just passed into engagement with one of the segments of the commutator-ring 12, and thence through the winding $a$ of the stator to the central connecting-ring $d$, from the latter through a second winding $b$ of the stator, and back to the commutator-brush 18, which, it will be noted, is at this moment engaged with the commutator-ring 13. From the commutator-ring 13 the current passes out over conductor $w$, which constitutes the winding of the rotor, and back to slip-ring 14, with which it is permanently connected. From the slip-ring the current passes to brush 22, and thence out to the return main line $y$. In the diagram the direction of flow of the currents over the several conductors is indicated by the arrow-heads, and it will be noted that the winding or conductor $c$ is idle—that is to say, the commutator-brush 19, with which the conductor $c$ is connected, is at this moment resting in engagement with one of the insulating-blocks or spaces between the commutator-segments. Considering the effect of the circulation of currents thus described, it will be seen that conductor $a$ first encircles the two poles $n$ and $o$ of the stator, passing around both in a direction to induce positive polarity, then passing in the reverse direction around the pole $p$, thereby inducing negative polarity, and so on around the stator to the right. The full current in the second active winding $b$, it will be noted, is in the same direction around the stator-pole $n$ as that of the winding $a$; but instead of encircling both $n$ and $o$ the winding $b$ encircles $n$ only, while $o$ is coupled with $p$ by the winding $b$, the coils being reversely arranged from those encircling $n$. It will be seen, therefore, that while $n$ is polarized by the combined effect of both windings $a$ and $b$ the pole $o$ is neutral, because the effect of the winding $a$ thereon is offset by the opposite effect of the winding $b$. The pole $p$ is likewise energized by the combined effect of both conductors *a* and *b*, which, however, extend around this pole in the proper direction to induce negative polarity. By inspection of the diagram it will be seen that these same conditions obtain around the entire stator, there being a north pole, a neutral pole, and a south pole in regular alternation. When the circuits are flowing as last described, the three north poles of the stator are located in advance of corresponding south poles of the rotor. The three south poles of the stator are in rear of corresponding south poles of the rotor, while the north poles of the rotor are severally passing the neutral poles, as shown clearly in the diagram. It follows that magnetic circuits will be induced, which will flow approximately as indicated in the dotted circuit-lines indicated by the numerals 41 and 41'—that is to say, poles *n* and *p* of the stator constituting a pair of opposite polarity, the magnetic circuit will be from pole *p* through the body of the stator to pole *n*, thence across the gap between the stator and rotor to the nearest south pole of the latter, (designated 42,) from the latter through the body of the rotor to the adjacent north pole 43, and thence across the gap between the stator and rotor back to the south pole *p* of the stator, thus completing the magnetic circuit. At the same time poles *p* and *q* of the stator constituting a pair will induce a magnetic circuit from pole *p* through the body of the stator to *q*, thence across the gap to the nearest rotor-pole of opposite polarity 44, from the latter through the body of the stator to the pole-piece 43 of opposite polarity, and back across the back to pole *p*, thus completing this magnetic circuit. The result of these magnetic circuits is to induce an effective torque. The circuits will exist as last described until the rotor has rotated an angular distance equal to twice the width of one of the commutator-brushes, whereupon the parts will be brought to the position illustrated in Fig. 7—that is to say, the commutator-brush 18 will then have passed out of contact with commutator-ring 13, while at the same instant commutator-brush 19 will be brought into bearing with said ring 13. This commutation will render idle the winding *b* and render active the winding *c*. The effect of this commutation will be to convert poles *n*, *q*, and *t* from north poles into neutral poles, while poles *o*, *r*, and *u*, which were theretofore neutral, will now become north poles, and the south poles *p*, *s*, and *v* will remain as before.

It will be obvious from the foregoing that a rotating magnetic field is induced, which field progresses around the armature by an alternate expansion and contraction of each magnetic field as distinguished from a bodily jumping forward of the magnetic fields— that is to say, the induced magnetic fields included within the several magnetic circuits will be alternately broadened and narrowed considered circumferentially of the armature, the broadening of each field being at the advance side thereof and the contraction occurring at the rear or following side of the field. In other words, at one stage of rotation one pair of poles of opposite sign will be separated only by a single gap or winding-recess, while the corresponding poles of opposite sign at either side thereof will be removed twice as far, while at the next stage of rotation these conditions will be exactly reversed, the two poles which were previously separated only by a single gap being now separated by two gaps and an intervening neutral pole. A further angular advance of the rotor equal to twice the width of one of the commutator-brushes will carry the brush 17 out of contact with commutator-ring 12 and at the same time bring the commutator-ring 18 into contact therewith, thus rendering the winding *b* active and the winding *a* idle. The effect of this commutation is indicated in Fig. 8, wherein it will be seen that neutral poles *n*, *q*, and *t* have now become south poles, that the north poles remain the same as in diagram 7, while the south poles *p*, *s*, and *v* of diagram 7 have now become neutral poles, thus inducing magnetic circuits, as indicated in the diagram. A further rotation of the armature and angular distance equal to one-half the distance of the commutator-brushes brings about the conditions shown in Fig. 9, in which it will be noted that the circuits are exactly the same as in Fig. 6, except that they are reversed— that is to say, windings *a* and *b* are now active; but the commutator-brush 17, with which *a* is connected, now engages a commutator-ring 13, while the commutator-brush 18, with which *b* is connected, engages the commutator-ring 12. The succeeding two commutations will bring the conditions back to that illustrated in Fig. 6, thus completing a complete cycle of commutations, during which time the rotor will have rotated through one-third of a complete revolution.

It will be understood from the foregoing that a shifting field of attraction is produced which rotates within the stator always in advance of the rotor. For example, in Fig. 6 the pole *n* of the stator is positive. In Fig. 7 the pole *n* has become neutral and the positive pole is *o*. In Fig. 8 *o* still remains positive; but the negative pole next in rear, which in Fig. 7 was the pole *v*, has advanced to *n*, while in Fig. 9 the positive pole has advanced to *p* and pole *o* has become neutral. By comparing the relations of the poles of the rotor to the shifting poles of the stator it will be seen that the relations are always such as to produce an effective torque upon the rotor. Owing to the well-understood laws of magnetic attraction, the torque will be at a maximum when the pole-pieces of the rotor are most nearly in register with the pole-pieces of opposite polarity of the stator, which condition will exist just at that instant prior to commutation; but owing to the frequent commutations the effective torque will be comparatively uniform.

It will of course be understood that the machine described is capable of use as a generator for producing current as well as a motor for converting current into mechanical energy. It will also be obvious from the foregoing explanation that the current produced when used as a generator will be a direct current, owing to the rectification of currents by the commutators, but the current produced will nevertheless fluctuate in volume during the rotation.

In Fig. 10 is shown diagrammatically a modified form of winding, which will be readily understood without detailed description. In this figure the windings of the stator are identical with those of the previously-described construction; but the rotor is compound wound. The arrangement is suitable for the machine when used as a dynamo. The several conductors $a$, $b$, and $c$, constituting the windings of the stator, extend from the commutator-brushes 17′, 18′, and 19′, respectively, and connect with the central ring $d$, as in the first instance. The positive conductor $x'$ leads to and is connected with a brush 20′, while the return-main $y'$ is connected with a brush 22′. The main or series winding $w'$ of the rotor is permanently connected at one end with the commutator-ring 13′, extends thence around the several pole-pieces of the rotor, and is connected at its opposite end with the slip-ring 14′. The shunt-winding $z$ is similarly connected with the commutator-ring 13′ and extends thence around the several pole-pieces of the rotor in electrical parallelism with the winding $w'$, but is connected at its opposite end with the commutator-ring 12′. Assuming that the machine is used as a dynamo, the conductors $x'$ and $y'$ constitute the external working circuit. Assuming that the rotor be driven in such direction that the commutator-ring 13′ is of positive potential and the opposite ring 12′ negative, the current generated in the armature-windings and transmitted to the commutator-ring 13′ through the brush 18′ will pass from the said ring over the two windings of the rotor through the conductors $w'$ and $z$. The shunt-winding being connected with an opposite or negative commutator-ring 12′ will therefore form a short circuit through the windings of the rotor only. The main winding $w'$, however, which leads back to and is connected with the slip-ring 14′, will convey current to the latter, which current will pass out over the working circuit through commutator-brushes 22′ and the conductors $y'$ and $x'$. Increased resistance in the external circuit will obviously result in increasing the relative amount of current flowing through the compound winding $z$ of the field, and thus by intensifying the field generate more current to compensate for the increased resistance in the external field.

The foregoing description is given as an example showing how the machine may be readily adapted for use as a self-regulating dynamo. It will also be understood that other modifications of the general arrangement of the windings may be made to adapt the machine to peculiar requirements.

While I have herein shown and described what I deem to be a preferred embodiment of the invention, yet it is to be understood that the leading features of the machine are believed to be broadly new, as indicated by the scope of the claims appended. Accordingly I do not limit myself to the details of construction and arrangement shown except as such details are made the subject of specific claims.

I claim as my invention—

1. The combination with an armature-body provided with a circular series of notches or winding-recesses, of a lap-winding arranged upon said armature-body and engaging said recesses, said winding consisting of circumferentially-extending relatively short and long coils, each recess being engaged by a plurality of coils, of which the short coils extend therefrom each way to the next circumferentially-adjacent recesses while the longer coils extend therefrom each way to other more remote recesses.

2. The combination with an armature-body provided with a circular series of notches or winding-recesses, of a lap-winding arranged upon said armature-body and engaging said recesses, said winding consisting of circumferentially-extending relatively short and long coils, each recess being engaged by a plurality of coils of which the shorter coils extend therefrom each way to other recesses, while the longer coils extend therefrom each way to other but more remote recesses.

3. The combination with an armature-body provided with a circular series of notches or winding-recesses, of a lap-winding arranged upon said armature-body and engaging said recesses, said winding consisting of circumferentially-extending relatively short and long coils, each recess being engaged by a plurality of coils of which the shorter coils extend therefrom each way to other recesses, while the longer coils extend therefrom each way to other but more remote recesses, the winding of the armature as a whole being symmetrical and each recess engaged by a substantially like number of turns.

4. An armature-body provided with a circumferential series of notches or winding-recesses, an uneven number of windings upon said body and engaging said recesses, each of which windings extends completely around the armature circumferentially and is composed of alternate relatively short and long coils, the coils of the several windings being so disposed relatively to each other that each pole-piece, as defined between circumferentially-contiguous notches is included within one of the shorter coils and one of the longer coils, a common connecting-ring at the electrical center of the armature with which each of said windings is connected, and a commutator mechanism coöperating with the armature and whereby the windings are severally alternately rendered active and inactive, the active windings being connected in series during their activity.

5. In an electric motor or generator, an armature provided with a plurality of windings arranged to induce magnetic poles, each winding consisting of alternated circumferentially long and short coils, a commutator mechanism coöperating therewith to alternately open and close said several win ings to induce upon each commutation active poles of opposite polarity and other intervening neutral poles, the active poles of each polarity being changed to neutral poles and thereafter to poles of opposite polarity, and the neutral poles formed upon each commutation being formed at successively-advanced points around the armature, whereby a rotating magnetic field is induced.

6. An armature-body provided with a circular series of notches or winding-recesses, an uneven number of windings upon said body and engaging said recesses, each of which windings extends completely around the armature circumferentially and is composed of alternate coils unlike in circumferential reach or size, the coils of different windings being disposed in offset or overlapping relation to those of each of the other windings, and a commutator mechanism coöperating therewith.

7. An armature-body provided with a circular series of notches or winding-recesses, an uneven number of windings upon said body and engaging said recesses, each of which windings extends completely around the armature circumferentially and is composed of alternate relatively short and long coils, the coils of the several windings being so disposed relatively to each other that each pole-piece, as defined between circumferentially-contiguous notches, is included within one of the shorter coils and one of the longer coils, and a commutator mechanism coöperating therewith whereby the windings are alternately rendered active and inactive.

8. In an electric motor or generator, an armature provided with an uneven number of windings, each extending completely around the armature-body circumferentially, and each consisting of alternate relatively long and short coils arranged in overlapping relation and symmetrically as a whole, said windings being arranged to encircle pole portions, each of which is included within a short coil and a long coil, a commutator mechanism coöperating to open said windings successively and whereby the uneven windings are rendered inactive, and an even number of active magnetic poles induced and intervening inactive poles produced, and a coöperating relatively movable field element having a number of poles equal to the number of active poles of the armature.

9. In an electric motor or generator, an armature provided with an uneven number of windings each extending completely around the armature-body circumferentially and each consisting of alternate relatively long and short coils, said windings being arranged in overlapping relation and symmetrically as a whole, and a commutator mechanism operating to open the circuit of all of the uneven numbered windings, said windings being alternately opened, a common connector at the electrical center of said armature, and a relatively movable field member, substantially as described.

10. In an electric motor or generator, an armature provided with a circumferential series of winding-recesses extending entirely around the armature, disposed at equal angular distances apart and uneven in number, a plurality of windings, each consisting of alternate relatively long and short coils engaged with said winding-recesses, said windings arranged in overlapping relation relatively to each other, a field member provided with an even number of poles arranged to coöperate with said armature, a winding upon said field member arranged to induce poles of permanent polarity alternately disposed therearound, and a commutator mechanism coöperating with said armature and field member, substantially as described.

11. In an electric motor or generator, an armature provided with a circumferentially-disposed series of winding-recesses and interposed pole projections extending entirely around the armature, three separate windings engaging the recesses of said armature, each of which windings consists of alternate short and long coils of which the short coils encircle single-pole projections and the long coils encircle double-pole projections, said windings being disposed in overlapping relation relatively to each other and constituting an armature-winding-symmetrical as a whole, a field member arranged to coöperate with said armature and provided with poles, disposed at uniform angular distances apart around said field member, a winding consisting of alternate right and left turns or coils encircling the pole-pieces of said field member, the number of poles of the armature and field members bearing the relation of nine to six, a commutator mechanism arranged to successively cut out of circuit each of the three windings of the armature, and electrical connections whereby two of the windings of the armature are maintained in series with each other at all times, and the winding of the field member in series with the active windings of the armature, substantially as described.

12. In an electric motor or generator, an armature provided with a circumferentially-disposed series of winding-recesses and interposed pole projections extending entirely around the armature, three separate windings engaging the recesses of said armature, each of which windings consists of alternate short and long coils of which the short coils encircle single-pole projections and the long coils encircle double-pole projections, said windings being disposed in overlapping relation relatively to each other and constituting an armature-winding symmetrical as a whole, a field member arranged to coöperate with said armature and provided with poles, disposed at uniform angular distances apart around said field member, a winding consisting of alternate right and left turns or coils encircling the pole-pieces of said field member, the number of poles of the armature and field members bearing the relation of nine to six, a commutator mechanism consisting of a circumferential series of commutator-segments of alternate positive and negative polarity, each of a circumferential width equal to three-fourths of the angular distance between the centers of adjacent winding-recesses of the armature, and three commutator-brushes arranged to coöperate with said commutator-segments, each of a circumferential width equal to one-third of the width of the commutator-segments, and two of which are disposed at an angular distance apart between centers equal to the angular distance between the centers of adjacent winding-recesses of the armature, and the third of which commutator-brushes is disposed diametrically opposite a point midway between said first two commutator-brushes, and electrical connections connecting said several windings and brushes, and whereby two of the windings of the armature are maintained in series with each other and the winding of the field member in series with the active windings of the armature, substantially as described.

13. In an electric motor or generator, means for effecting a rotating magnetic field comprising an armature-body, a plurality of part windings upon said armature-body, each of which extends from an outside terminal to the electric center of the armature, a common connecting device with which all of said part windings are connected at said electrical center, and a common commutator mechanism operating to open each winding successively and to simultaneously connect the part-winding previously idle in series with that with which the last-opened winding was last connected, said windings being arranged to induce neutral poles, and a plurality of intervening active poles and the cycle of commutation of each pole-piece being positive, neutral, negative, whereby a rotating magnetic field is induced.

14. In an electric motor or generator, means for effecting a rotating magnetic field comprising an armature provided with a plurality of fractional windings each of which fractions extends from an outside terminal to the electric center of the armature, means connecting all of said fractional windings at the electrical center of the armature, and a commutating mechanism operating to open each fractional winding successively, and to simultaneously connect a fractional winding previously idle in series with another fractional winding, said windings arranged to induce interspersed active and neutral poles, the neutral poles being formed progressively around the armature in a direction the reverse of the direction of rotation of the inducing-field, whereby active poles of opposite polarity are alternately formed contiguous to each other and then separated by an intervening neutral pole, for the purpose set forth.

15. In an electric motor or generator, an armature provided with fractional windings, arranged in overlapping relation and each comprising alternate short and long coils, and a commutator mechanism coöperating to open said fractional windings successively and to connect other fractional windings to induce resultant pairs of poles of opposite sign, which poles are alternately broadened and narrowed circumferentially to produce a rotating magnetic field, which progresses with a walking movement.

16. In an electric motor or generator, an armature provided with fractional windings, arranged in overlapping relation and each comprising alternate short and long coils, and a commutator mechanism coöperating to open said fractional windings successively and to connect other fractional windings to induce resultant pairs of poles of opposite sign, which poles are alternately broadened and narrowed circumferentially to produce a rotating magnetic field, which progresses with a walking movement, the commutation which results in broadening the poles of one sign being simultaneous with a commutation which results in narrowing the poles of the opposite sign.

JOHN F. BECK.

Witnesses:
ALBERT H. GRAVES,
E. F. HAMM.